United States Patent
Freeland et al.

(10) Patent No.: US 6,830,705 B1
(45) Date of Patent: Dec. 14, 2004

(54) LIQUID STABLE MDI PREPOLYMERS AND LIQUID STABLE CURATIVE SYSTEMS SUITABLE FOR ROOM TEMPERATURE CASTING WHICH YIELD HIGH PERFORMANCE URETHANE ELASTOMERS

(75) Inventors: Gerard Scott Freeland, Lawton, MI (US); James E. Doyle, Richland, MI (US)

(73) Assignee: AZON USA Inc., Kalamazoo, MI (US)

( * ) Notice: Subject to any disclaimer, the term of this patent is extended or adjusted under 35 U.S.C. 154(b) by 175 days.

(21) Appl. No.: 09/593,913

(22) Filed: Jun. 14, 2000

(51) Int. Cl.⁷ .................... C07C 271/28; C07C 271/26; C08G 18/12; C08G 18/10; C08G 18/48
(52) U.S. Cl. ................. 252/182.2; 252/182.21; 252/182.22; 252/182.25; 252/182.26; 252/182.27; 252/182.29; 528/59; 528/60; 528/66; 528/77; 560/26; 560/330; 560/359
(58) Field of Search .................. 252/182.2, 182.21, 252/182.22, 182.25, 182.26, 182.27, 182.29; 528/59, 60, 66, 77; 560/26, 330, 359

(56) References Cited

U.S. PATENT DOCUMENTS

| | | | |
|---|---|---|---|
| 2,939,851 A | 6/1960 | Orchin | 521/129 |
| 3,161,993 A | 12/1964 | Balz | 366/128 |
| 3,904,796 A | 9/1975 | Zora et al. | 427/390 |
| 4,134,883 A | 1/1979 | Mendelsohn et al. | 528/63 |
| 4,294,951 A | 10/1981 | Sugita et al. | 528/55 |
| 4,307,544 A | 12/1981 | Balz | 51/7 |
| 4,379,904 A * | 4/1983 | Ehrlich et al. | 528/65 |
| 4,385,133 A * | 5/1983 | Alberino et al. | 521/159 |
| 4,520,042 A | 5/1985 | Smith | 427/209 |
| 4,695,618 A | 9/1987 | Mowrer | 528/55 |
| 4,701,476 A | 10/1987 | Burchell, Jr. et al. | 521/159 |
| 4,716,210 A | 12/1987 | Trummelmeyer et al. | 528/75 |
| 5,115,007 A | 5/1992 | Chihara et al. | 524/267 |
| 5,130,404 A | 7/1992 | Freeland | 528/52 |
| 5,182,354 A | 1/1993 | Horn et al. | 528/60 |
| 5,194,558 A | 3/1993 | Carlston et al. | 528/60 |
| 5,350,778 A | 9/1994 | Steppan et al. | 521/159 |
| 5,554,713 A | 9/1996 | Freeland | 528/76 |
| 5,594,097 A | 1/1997 | Chaffanjon et al. | 528/419 |
| 5,621,016 A | 4/1997 | Murty et al. | 521/159 |
| 5,795,633 A | 8/1998 | Yokoyama et al. | 428/35.7 |
| 6,376,698 B1 * | 4/2002 | Bleys | 560/26 |

FOREIGN PATENT DOCUMENTS

EP    0964013 A1    6/1999

* cited by examiner

Primary Examiner—Rabon Sergent
(74) Attorney, Agent, or Firm—Flynn, Thiel, Boutell & Tanis, P.C.

(57) ABSTRACT

The invention relates to liquid stable MDI prepolymers and curative systems which are suitable for room temperature casting and which yield high performance low-shrinkage urethane elastomers upon room-temperature curing, the prepolymer and curative components, the elastomers themselves, and separately packaged prepolymer component and its complementary curative component provided as a single unit or kit.

13 Claims, No Drawings

LIQUID STABLE MDI PREPOLYMERS AND LIQUID STABLE CURATIVE SYSTEMS SUITABLE FOR ROOM TEMPERATURE CASTING WHICH YIELD HIGH PERFORMANCE URETHANE ELASTOMERS

BACKGROUND OF THE INVENTION

1. Field of the Invention

Liquid stable MDI prepolymers and liquid stable curative systems suitable for room temperature casting which yield high performance urethane elastomers.

2. Prior Art

A search of the prior art showed many prepolymers and many curatives, none of which were specifically adapted to room temperature casting for the production of high-performance urethane elastomers, especially such elastomers which have remarkable low-shrink characteristics, wherein both the prepolymer and the curative are liquid or semi-liquid and stable at room temperature, and wherein the curing can also be effected at room temperature, and much less with systems which are totally free of TDI and which rely solely on MDI as the isocyanate-providing ingredient of the prepolymer.

OBJECTS OF THE INVENTION

It is an object of the present invention to provide liquid stable MDI prepolymers and liquid stable curative systems which are specifically adapted for room temperature casting and which yield high performance urethane elastomers upon room-temperature curing, the elastomer itself, as well as commercial combinations of the prepolymer and its complementary curative, separately packaged but together as a single unit or kit. Other objects of the invention will become apparent hereinafter.

SUMMARY OF THE INVENTION

What we believe to be our invention, then, inter alia, comprises the following, singly or in combination:

A room-temperature liquid stable prepolymer (P) which is the reaction product of
- a) methylene diphenylisocyanate or a prepolymer of methylene diphenylisocyanate and an about 500–1000 equivalent weight polytetramethylene ether glycol or polyoxypropylene/polyoxyethylene diol or triol having at least 21% residual NCO,
- b) polytetramethylene ether glycol of about 500 to 1000 equivalent weight, and
- c) a polyoxypropylene/polyoxyethylene triol or polyoxypropylene triol of about 1300 to 2000 equivalent weight, the percentage by weight in the prepolymer (P) being about 32 to 72% of (a), about 52 to 22% of (b), and about 6 to 15% of (c), and the percentage of residual NCO in the prepolymer (P) being about 6 to 18% by weight, the prepolymer (P) having a viscosity at room temperature of about 1200 to 26000 cps, which prepolymer (P) is curable and castable at room temperature to yield a high-performance urethane elastomer;

such a prepolymer (P) wherein the percentage of residual NCO in the prepolymer (P) is about 11.5–13.5% by weight and wherein the prepolymer (P) has a room temperature viscosity of about 3500 to 5000 cps;

such a prepolymer (P) wherein a) is methylene diphenylisocyanate;

such a prepolymer (P) wherein c) is a polyoxypropylene/polyoxyethylene triol having an equivalent weight of about 1300 to 2000 or a polyoxypropylene triol having an equivalent weight of about 1300 to 2000;

such a prepolymer (P) wherein (a) is a liquid uretonimine-modified methylene diphenylisocyanate;

such a prepolymer (P) wherein b) has an equivalent weight of about 500;

such a prepolymer (P) wherein b) has an equivalent weight of about 1000;

such a prepolymer (P) wherein a) is a previously-prepared reaction product of methylene diphenylisocyanate and polytetramethylene ether glycol having an equivalent weight of about 500 to 1000;

such a prepolymer (P) wherein a) is a previously-prepared reaction product of methylene diphenylisocyanate and a polyoxypropylene/polyoxyethylene diol having an equivalent weight of about 500 to 1000;

such a prepolymer (P) which is curable at room temperature with an approximately stoichiometric equivalent of a liquid curative consisting essentially of the following components:

(1) a polyoxypropylene/-polyoxyethylene diol of about 1000 to 2000 equivalent weight, (2) a polyoxypropylene/-polyoxyethylene triol of about 1300 to 2000 equivalent weight, (3) a chain extender having an equivalent weight of about 25 to 125, (4) a room-temperature liquid stable prepolymer (P) having a 6 to 18% residual NCO, (5) a diluent, (6) a degassing aid, and (7) a urethane catalyst, the relative amounts by weight being respectively 30–90%, 3–20%, 5–30%, 0–30%, 0–15%, 0.001–0.05%, and 0.01–0.5%;

such a prepolymer (P) which is cured at room temperature with an approximately stoichiometric equivalent of a liquid curative consisting essentially of the following components:

(1) a polyoxypropylene/-polyoxyethylene diol of about 1000 to 2000 equivalent weight, (2) a polyoxypropylene/-polyoxyethylene triol of about 1300 to 2000 equivalent weight, (3) a chain extender having an equivalent weight of about 25 to 125, (4) a room-temperature liquid stable prepolymer (P) having a 6 to 18% residual NCO, (5) a diluent, (6) a degassing aid, and (7) a urethane catalyst, the relative amounts by weight being respectively 30–90%, 3–20%, 5–30%, 0–30%, 0–15%, 0.001–0.05%, and 0.01–0.5%;

such a cured prepolymer wherein the amounts of (4) and (5) in the curative are respectively 10–20 and 5–15% by weight;

such a prepolymer (P) which is curable at room temperature with an approximately stoichiometric equivalent of a liquid curative consisting essentially of the following components:

(1) a polyoxypropylene/-polyoxyethylene diol of about 1000 to 2000 equivalent weight, (2) a polyoxypropylene/-polyoxyethylene triol of about 1300 to 2000 equivalent weight, (3) a chain extender having an equivalent weight of about 25 to 125, (4) a room-temperature liquid stable prepolymer (P) having a 6 to 18% residual NCO, (5) a diluent, (6) a degassing aid, and (7) a urethane catalyst, the relative amounts by weight being respectively 30–90%, 3–20%, 5–30%, 0–30%, 0–15%, 0.001–0.05%, and 0.01–0.5% to give a cured urethane elastomer having the following properties after mixing and curing for seven days at room temperature:

| | |
|---|---|
| Tensile strength (ASTM Method D-412) | about 1300–2700 psi |
| Elongation (ASTM Method D-412) | about 250–700% |
| Die C Tear (ASTM Method D-695) | about 140–400 pli |
| Split Tear (ASTM Method D-1938) | about 20–100 pli |
| Rebound (ASTM Method D-2632) | about 45–65% |
| Shore A Hardness (ASTM Method D-2240) | about 70–95 |
| Gel time (25° C.) | about 14–40 min.; | such a prepolymer (P) wherein the percentage of residual NCO in the prepolymer (P) is about 11.5–13.5% by weight and wherein the prepolymer (P) has a room temperature viscosity of about 3500 to 5000 cps and is cured at room temperature with an approximately stoichiometric equivalent of a liquid curative consisting essentially of the following components:

(1) a polyoxypropylene/-polyoxyethylene diol of about 1000 to 2000 equivalent weight, (2) a polyoxypropylene/-polyoxyethylene triol of about 1300 to 2000 equivalent weight, (3) a chain extender having an equivalent weight of about 25 to 125, (4) a room-temperature liquid stable prepolymer (P) having a 6 to 18% residual NCO, (5) a diluent, (6) a degassing aid, and (7) a urethane catalyst, the relative amounts by weight being respectively 30–90%, 3–20%, 5–30%, 0–30%, 0–15%, 0.001–0.05%, and 0.01–0.5% and a room-temperature viscosity of about 300–50000 cps, to give a cured urethane elastomer having the following properties after mixing and curing for seven days at room temperature:

| | |
|---|---|
| Tensile strength (ASTM Method D-412) | about 1300–2700 psi |
| Elongation (ASTM Method D-412) | about 250–700% |
| Die C Tear (ASTM Method D-695) | about 140–400 pli |
| Split Tear (ASTM Method D-1938) | about 20–100 pli |
| Rebound (ASTM Method D-2632) | about 45–65% |
| Shore A Hardness (ASTM Method D-2240) | about 70–95 |
| Gel time (25° C.) | about 14–40 min.; | such a cured prepolymer wherein the amounts of (4) and (5) in the curative are respectively 10–20 and 5–15% by weight;

such a cured product wherein the prepolymer (P) is present in an up to about 13% stoichiometric excess with respect to the curative;

such a cured product wherein the prepolymer (P) is present in about a 2 to 7% stoichiometric excess with respect to the curative;

such a prepolymer (P) wherein the percentages by weight of a), b), and c) are respectively about 54%, about 36%, and about 10%;

such a prepolymer (P) cured with an approximately stoichiometric equivalent of a curative consisting essentially of (1) a polyoxypropylene/-polyoxyethylene diol of about 1000 to 2000 equivalent weight, (2) a polyoxypropylene/-polyoxyethylene triol of about 1300 to 2000 equivalent weight, (3) a chain extender having an equivalent weight of about 25 to 125, (4) a room-temperature liquid stable prepolymer (P) having a 11.5 to 13.5% residual NCO, (5) a diluent, (6) a degassing aid, and (7) a urethane catalyst, the relative amounts by weight being respectively approximately 54%, 13%, 10%, 15%, 8%, 0.005% and 0.006%;

such a cured prepolymer (P) wherein the curative has a viscosity at room temperature of about 3000–5000 cps and a specific gravity of about 1.05–1.08;

such a cured product wherein the prepolymer (P) is present in an up to about 13% stoichiometric excess with respect to the curative;

such a cured product the prepolymer (P) is present in about a 2 to 7% stoichiometric excess with respect to the curative;

such a cured prepolymer (P) wherein the properties after mixing and curing for seven days at room temperature are as follows:

| | |
|---|---|
| Tensile strength (ASTM Method D-412) | about 1550 psi |
| Elongation (ASTM Method D-412) | about 500% |
| Die C Tear (ASTM Method D-695) | about 250 pli |
| Split Tear (ASTM Method D-1938) | about 45 pli |
| Rebound (ASTM Method D-2632) | about 55% |
| Shore A Hardness (ASTM Method D-2240) | about 80 |
| Gel time (25° C.) | about 20–30 min.; | such a cured prepolymer (P) wherein the degassing aid is a silicone emulsion;

such a cured prepolymer (P) wherein the catalyst is a mixture of triethylene diamine and 2,3-dimethyltetrahydropyrimidine or bismuth neodecanoate;

such a cured prepolymer (P) wherein the degassing aid is a silicone emulsion and the catalyst is a mixture of triethylene diamine and 2,3-dimethyltetrahydropyrimidine or bismuth neodecanoate.

Moreover, a kit comprising the separately packaged prepolymer (P) and a separately packaged curative consisting essentially of (1) a polyoxypropylene/-polyoxyethylene diol of about 1000 to 2000 equivalent weight, (2) a polyoxypropylene/-polyoxyethylene trial of about 1300 to 2000 equivalent weight, (3) a chain extender having an equivalent weight of about 25 to 125, (4) a room-temperature liquid stable prepolymer (P) having a 6 to 18% residual NCO, (5) a diluent, (6) a degassing aid, and (7) a urethane catalyst, the relative amounts by weight being respectively 30–90%, 3 20%, 5–30%, 0–30%, 0–15%, 0.001–0.05%, and 0.01–0.5%;

such a kit wherein the curative has a viscosity at room temperature of about 300–50000 cps and a specific gravity of about 1.02–1.15;

such a kit comprising the separately packaged prepolymer (P) wherein the percentage of residual NCO in the prepolymer (P) is about 11.5–13.5% by weight and wherein the prepolymer (P) has a room temperature viscosity of about 3500 to 5000 cps and a separately packaged curative consisting essentially of (1) a polyoxypropylene/-polyoxyethylene dial of about 1000 to 2000 equivalent weight, (2) a polyoxypropylene/-polyoxyethylene trial of about 1300 to 2000 equivalent weight, (3) a chain extender having an equivalent weight of about 25 to 125, (4) a room-temperature liquid stable prepolymer (P) having a 6 to 18% residual NCO, (5) a diluent, (6) a degassing aid, and (7) a urethane catalyst, the relative amounts by weight being respectively 30–90%, 3–20%, 5–30%, 0–30%, 0–15%, 0.001–0.05%, and 0.01–0.5% and a room-temperature viscosity of about 300–50000 cps;

such a kit wherein the amounts of (4) and (5) in the curative are respectively 10–20 and 5–15% by weight;

such a kit wherein the curative consists essentially of the stated components in the following approximate percentages: 54%, 13%, 10%, 15%, 8%, 0.005%, and 0.006% and has a viscosity at room temperature of about 3000 to 5000 cps and a specific gravity of about 1.05–1.08;

such a kit wherein the percentages by weight of a), b), and c) in the prepolymer are respectively about 54%, about 36%, and about 10%; and such a kit wherein the degassing aid in the curative is a silicone emulsion and the catalyst is a mixture of triethylene diamine and 2,3-dimethyltetrahydropyrimidine or bismuth neodecanoate.

GENERAL DESCRIPTION OF THE INVENTION

Component Descriptions

A. Prepolymer (P) Portion

The polyol components used in the prepolymer portion of the system are represented by polytetramethylene ether glycol or polyoxypropylene, polyoxyethylene or mixed polyoxypropylene/polyoxyethylene diols or triols having molecular weights between 1000 and 6000 and an OH-functionality of about 2.0 to 3.0. Representative polyol components are:

Polytetramethylene ether glycol having a molecular weight between about 1000 and 2800 and a functionality of about 2.0, such as PTMEG 2000 or an equivalent QO2000™ or Terathane 2000™. Other products which can be used include PTMEG 1000, Great Lakes QO1000™, or DuPont Terathane 1000™. Further alternates include polyoxypropylene, polyoxyethylene or mixed polyoxypropylene/polyoxyethylene diols with molecular weights from 1000 to 2000 with functionalities of about 2.0. Examples of these alternates include Arch Poly-G 20-56™, Arch Poly-G 55-112™, Bayer Multranol 3600™, Lyondell Acclaim 2220™, Dow Voranol 220-056™, and other polyols familiar to one skilled in the art such as:

Polyether triols having a molecular weight of about 4200 to 6000 and a functionality of about 3.0 including low unsaturation polyethers, such as Lyondell Acclaim 6320™. Other products which can be used include Arch Poly-G 85-28™, Arch Poly-G 30-28™, Arch Poly-L 385-29™, or Dow Voranol 230-027™. Further alternates include polyoxypropylene, polyoxyethylene or mixed polyoxypropylene/polyoxyethylene triols with molecular weights of 4200 to 6000 and functionalities of about 3.0, which will be familiar to one skilled in the art.

The isocyanate component used in the prepolymer portion of the system is diphenylmethane diisocyanate having a functionality of about 2.0–2.1. The prepolymer is based on pure methylene diphenylisocyanate (MDI) such as Mondur M™ from Bayer or Rubinate 44™ from Huntsman or their equivalent, or a previously prepared isocyanate-terminated prepolymer based upon MDI and a polytetramethylene ether glycol (PTMEG) of 1000 or 2000 molecular weight (MW). Examples of these prepolymers include, but are not limited to, Mondur ME230™ from Bayer and Rubinate 1027™ from Huntsman. Other isocyanate functional materials suitable for use include uretonimine-modified methylene diphenylisocyanates commonly referred to as Mondur CD™ from Bayer, Rubinate 1680™ from Huntsman, or Isonate 2143L™ from Dow and other equivalents. We have also evaluated and found prepolymers based on methylene diphenylisocyanate reacted with polyoxyethylene/polyoxypropylene diols of 1000 and 2000 MW to be acceptable. These materials are known by such tradenames as Isonate 2181™ from Dow, Mondur MP210™ from Bayer, Rubinate 1209™ and Rubinate 1790™ from Huntsman.

The prepolymer advantageously has a room-temperature viscosity of about 1200 to 26000 cps. Especially when the percentage of residual NCO in the prepolymer is the preferred 11.5–13.5% NCO, a viscosity of 3500–5000 cps is also preferred.

B. Curative (C) Portion

Polyol components used in the curative portion of the system are polyoxypropylene, polyoxyethylene, or mixed polyoxypropylene/polyoxyethylene diols or triols having molecular weights between 2000 and 6000 and OH-functionality of about 2.0 to 3.0. Representative polyol components are:

Commercially available low unsaturation polyoxyethylene terminated polyoxypropylene polyether triols and diols having a molecular weights of about 2000 to 6000 and functionalities of between about 2.0 and 3.0, such as Lyondell Acclaim 6320™ and Acclaim 2220™. Other products which can be used include Arch Poly-L 385-29™, Poly-L 255-50™, Poly-G 85-28™, 30-28™, 55-56™, Dow Voranol 220-028™ and 230-027™. Further alternates include polyoxypropylene, polyoxyethylene or mixed polyoxypropylene/polyoxyethylene diols and triols with molecular weights from 2000 to 6000 and functionalities of about 2.0 to 3.0 which will be familiar to one skilled in the art.

The curative portion advantageously has a room-temperature viscosity of about 300–50000 cps, especially 4000–5000 cps, and most advantageously a specific gravity of about 1.02 to 1.15 and especially 1.05–1.08.

The crosslinker: The crosslinkers or chain extenders have molecular weights between about 50 and 250 and hydroxyl functionality of about 2.0, and thus an equivalent weight of about 25 to 125, such as 1,4-BDO or MPDiol. Some examples are: butanediol, 2-methyl-1,3 propanediol, trimethylolpropane, glycerine, ethylene glycol based crosslinkers such as DEG (diethylene glycol) and TEG (triethylene glycol), propylene based crosslinkers such as DPG (dipropylene glycol) or any combination of these components or other known crosslinkers familiar to one skilled in the art.

The catalyst: Any effective urethane/urethane-inducing catalyst or catalyst combination of the type which is normally used for urethane production can be employed in an effective polyurethane-catalyzing amount. Tertiary amines and organometallic catalysts are especially suitable. Some examples of suitable catalysts are those containing tin, such as dibutyltindilaurate, bismuth, such as bismuth neodecanoate, or zinc, such as zinc octoate. Some examples of tertiary amines are: triethylene diamine, 2,3-dimethylhydropyrimidine, and N,N'-dimorpholinodiethyl ether. An effective amount of the polyurethane-catalyzing catalyst to obtain the desired reaction profile and work life is employed. A metal catalyst works well for this product, but tertiary amines and catalyst combinations also provide acceptable products. Representative catalysts and catalyst combinations are utilized in the Examples which follow, and additional suitable catalysts are disclosed in our U.S. Pat. No. 5,554,713.

Prepolymer in the curative: A room-temperature liquid stable prepolymer (P) as defined earlier, namely, which is the reaction product of a) methylene diphenylisocyanate or a prepolymer of methylene diphenylisocyanate and an about 500–1000 equivalent weight prepolymer of MDI and polytetramethylene ether glycol or polyoxypropylene/polyoxyethylene diol or triol having at least 21% residual NCO, b) polytetramethylene ether glycol of about 500 to 1000 equivalent weight, and c) a polyoxypropylene/polyoxyethylene triol or polyoxypropylene triol of about 1300 to 2000 equivalent weight, the percentage by weight in the prepolymer (P) being about 32 to 72% of (a), about 52 to 22% of (b), and about 7 to 15% of (c), and the percentage of residual NCO in the prepolymer (P) being about 6 to 18% by weight, the prepolymer (P) having a viscosity at room temperature of about 1200 to 26000 cps. Some examples of commercially available methylene diisocyanates are pure MDI and uretonimine-modified MDI. Amounts of prepolymer in the curative are: 0–30, preferably 10–20, and advantageously about 15 to 17% by weight of the curative.

Diluent: Any suitable urethane-compatible material including, but not limited to alkyl phthalates such as dioctylphthalate, diisobutylphthalate, allyl benzyl phthalate; butyrates such as isobutyl isobutyrate or 2,2,4-trimethyl-1,3 pentanediol diisobutyrate; phosphates such as triphenyl phosphate or tributyl phosphate; and adipates such as dioctyladipate. Further examples include dipropylene glycol dibenzoate, diethylene glycol dibenzoate, dimethyl glutarate, dimethyl adipate, and dimethyl succinate. The diluent can thus be any suitable urethane-compatible material including, but not limited to, phthalate, adipate, or phosphate-based diluents such as: diisobutylphthalate or isobutylbutyrate, good examples being Velsicol's Benzoflex™ 988SG or Solutia's Santicizer™ 160 or 261, or other materials familiar to one skilled in the art. Amounts of diluent in the curative are: 0–30, preferably 5–15, and advantageously about 7 to 9% by weight of the curative.

Degassing agent: Any degassing agent typically used in the industry to eliminate or reduce the formation of bubbles in polyurethane products. Typical materials containing silicone as surface tension depressing agents can be utilized. Some examples of these materials are: OSI's SAG 47™, Furane Products' Airout™, and Ciba-Giegy's X-Air™. Other bubble elimination agents known to users familiar with the art may also be employed.

DETAILED DESCRIPTION OF THE INVENTION

The following Examples are given by way of illustration only, and are not to be construed as limiting. All Curative Examples and Urethane Production Examples are carried out at room temperature (approximately 77° F.).

PREPOLYMER BATCH PROCESSING PROCEDURE

Examples of typical procedure for processing a prepolymer followed by other examples of weights and measures for alternate prepolymers follow.

Prepolymer Example 1 (P1)

A laboratory blend of about one-half gallon of the prepolymer was prepared by charging 812 grams of Rubinate 1027™ into a clean glass reactor. Dry nitrogen gas was used to blanket the liquid and mild agitation mixing was initiated via a mechanical mixing device. The Rubinate 1027™ is a commercial prepolymer produced from Rubinate 44™ and a polytetramethylene ether glycol of about 1000 molecular weight to yield a 26.5–27.5% NCO terminated-isocyanate of nominal 2.0 functionality and an average molecular weight of 154. To this, 546.2 grams of Terathane 2000™ is charged with constant agitation under a nitrogen blanket. The Terathane 2000™ is a 2000 molecular weight polytetramethylene ether glycol with a nominal functionality of 2.0. To this, 154 grams of Acclaim 6320™ is charged with constant agitation under a nitrogen blanket. The Acclaim 6320 is a commercial low unsaturation polyoxyethylene terminated polyoxypropylene polyether triol having a molecular weight of about 6000 and a functionality of about 3.0. These components are allowed to mix to homogeneity for about 10 to 15 minutes while the temperature of the liquid is monitored by a Thermowatch™ temperature measuring and control device. The order of addition of components is not specific and some of the ingredients may be blended prior to addition to the reactor. Apply a heating mantle to the outside surface of the reaction flask and begin heating the flask with the aid of a variable autotransformer at a setting of 40%. Adjust the setpoint of the Thermowatch™ to 177° F. Monitor the temperature of the reacting components until it reaches 177° F. and then begin timing for prepolymer completion. About one hour after the reacting liquid has achieved 177° F., sample the liquid for an NCO determination. Determine the % NCO of the prepolymer following ASTM D2572. Continue sampling the % NCO approximately every hour until the % NCO between samples does not change by more than 0.5% and within 0.2 points of the theoretical % NCO. At this point, degas the prepolymer under a vacuum of about 28 inches of Hg, turn off the heating mantle, agitator and nitrogen blanket and transfer the prepolymer to an enclosed vessel under dry nitrogen. This prepolymer is allowed to cool to room temperature overnight and yields a nominal 12.5% NCO prepolymer with a viscosity of 4100 cps and a specific gravity of 1.09.

Further examples of prepolymer processing utilize the same manufacturing procedure with the specific differences prescribed in each example:

Prepolymer Example 2 (P2)

A laboratory blend of about one-quart of the prepolymer was prepared by charging 486.1 grams of Mondur CD™ into a clean glass reactor. Dry nitrogen gas was used to blanket the liquid and mild agitation mixing was initiated via a mechanical mixing device. The Mondur CD™ is a commercially available uretonimine-modified Mondur M™ to yield a room temperature liquid isocyanate with an NCO functionality of about 2.10 and a molecular weight of about 142. To this, 406.2 grams of Terathane 2000™ is charged with constant agitation under a nitrogen blanket. The Terathane 2000™ is a 2000 molecular weight polytetramethylene ether glycol with a nominal functionality of 2.0. To this, 108 grams of Acclaim 6320™ is charged with constant agitation under a nitrogen blanket. The Acclaim 6320™ is a commercial low unsaturation polyoxyethylene terminated polyoxypropylene polyether triol having a molecular weight of about 6000 and a functionality of about 3.0. This prepolymer is allowed to cool to room temperature overnight and yields a nominal 12.5% NCO prepolymer.

Prepolymer Example 3 (P3)

A laboratory blend of about one-gallon of the prepolymer was prepared by charging 2861 grams of Rubinate™ 1027 into a clean glass reactor. Dry nitrogen gas was used to blanket the liquid and mild agitation mixing was initiated via a mechanical mixing device. The Rubinate™ 1027 is a commercial prepolymer produced from Rubinate™ 44 and a polytetramethylene ether glycol of about 1000 molecular weight to yield a 27% NCO terminated-isocyanate of nominal 2.0 functionality and an average molecular weight of 154. To this, 888.4 grams of Terathane™ 2000 is charged with constant agitation under a nitrogen blanket. The Terathane™ 2000 is a 2000 molecular weight polytetramethylene ether glycol diol with a nominal functionality of 2.0. To this, 250.6 grams of Acclaim™ 6320 is charged with constant agitation under a nitrogen blanket. The Acclaim™ 6320 is a commercial low unsaturation polyoxyethylene terminated polyoxypropylene polyether triol having a molecular weight of about 6000 and a functionality of about 3.0. These components are allowed to mix to homogeneity for about 10 to 15 minutes while the temperature of the liquid is monitored by a Thermowatch™ temperature measuring and control device. Apply a heating mantle to the outside surface of the reaction flask and begin heating the flask with the aid of a variable autotransformer at a setting of 40%. Adjust the setpoint of the Thermowatch™ to 177° F. Monitor the temperature of the reacting components until it reaches 177° F. and then begin timing for prepolymer completion. About one hour after the reacting liquid has achieved 177° F., sample the liquid for an NCO determination. Determine the % NCO of the prepolymer following ASTM™ D2572. Continue sampling the % NCO approximately every one hour until the % NCO between samples does not change by more than 0.5% and within 0.2 points of the theoretical % NCO. At this point, degas the prepolymer under a vacuum of about 28 inches of Hg, turn off the heating mantle, agitator and nitrogen blanket and transfer the prepolymer to an enclosed vessel under dry nitrogen. This prepolymer is allowed to cool to room temperature over night and yields a nominal 18% NCO prepolymer with a viscosity of 1280 cps and a specific gravity of 1.119.

Prepolymer Example 4 (P4)

A laboratory blend of about one-gallon of the prepolymer was prepared by charging 1310.3 grams of Rubinate™ 1027 into a clean glass reactor. Dry nitrogen gas was used to blanket the liquid and mild agitation mixing was initiated via a mechanical mixing device. The Rubinate™ 1027 is a commercial prepolymer produced from Rubinate™ 44 and a polytetramethylene ether glycol of about 1000 molecular weight to yield a 27% NCO terminated-isocyanate of nominal 2.0 functionality and an average molecular weight of 154. To this, 2099.4 grams of Terathane™ 2000 is charged with constant agitation under a nitrogen blanket. The Terathane™ 2000 is a 2000 molecular weight polytetramethylene ether glycol diol with a nominal functionality of 2.0. To this, 590.2 grams of Acclaim™ 6320 is charged with constant agitation under a nitrogen blanket. The Acclaim™ 6320 is a commercial low unsaturation polyoxyethylene terminated polyoxypropylene polyether triol having a molecular weight of about 6000 and a functionality of about 3.0. These components are allowed to mix to homogeneity for about 10 to 15 minutes while the temperature of the liquid is monitored by a Thermowatch™ temperature measuring and control device. Apply a heating mantle to the outside surface of the reaction flask and begin heating the flask with the aid of a variable autotransformer at a setting of 40%. Adjust the setpoint of the Thermowatch™ to 177° F. Monitor the temperature of the reacting components until it reaches 177° F. and then begin timing for prepolymer completion. About one hour after the reacting liquid has achieved 177° F., sample the liquid for an NCO determination. Determine the % NCO of the prepolymer using ASTM™ D2572. Continue sampling the % NCO approximately every one hour until the % NCO between samples does not change by more than 0.5% and within 0.2 points of the theoretical % NCO. At this point, degas the prepolymer under a vacuum of about 28 inches of Hg, turn off the heating mantle, agitator and nitrogen blanket and transfer the prepolymer to an enclosed vessel under dry nitrogen. This prepolymer is allowed to cool to room temperature over night and yields a nominal 6.0% NCO prepolymer with a viscosity of 26000 cps and a specific gravity of 1.06.

Prepolymer Example 5 (PS)

A laboratory blend of about one-half gallon of the prepolymer was prepared by charging 911 grams of Mondur ME230™ into a clean glass reactor. Dry nitrogen gas was used to blanket the liquid and mild agitation mixing was initiated via a mechanical mixing device. The Mondur ME230™ is a commercial prepolymer produced from Mondur M™ and a polytetramethylene ether glycol of about 1000 molecular weight to yield a 23% NCO terminated-isocyanate of nominal 2.0 functionality and an average molecular weight of 182. To this, 436.3 grams of Terathane 2000™ is charged with constant agitation under a nitrogen blanket. The Terathane 2000™ is a 2000 molecular weight polytetramethylene ether glycol with a nominal functionality of 2.0. To this, 153.3 grams of Acclaim 6320™ is charged with constant agitation under a nitrogen blanket. The Acclaim 6320™ is a commercial low unsaturation polyoxyethylene terminated polyoxypropylene polyether triol having a molecular weight of about 6000 and a functionality of about 3.0. This prepolymer is allowed to cool to room temperature overnight and yields a nominal 12.5% NCO prepolymer.

Prepolymer Example 6 (P6)

A laboratory blend of about one-quart of the prepolymer was prepared by charging 462.48 grams of pre-melted Mondur M™ into a clean glass reactor. Dry nitrogen gas was used to blanket the liquid and mild agitation mixing was initiated via a mechanical mixing device. The Mondur M™ is a pure methylene diphenylisocyanate (MDI) from Bayer Chemicals with a % NCO of 33.6, a molecular weight of 250, and a functionality of 2.0. To this, 486 grams of Terathane 2000™ is charged with constant agitation under a nitrogen blanket. The Terathane 2000™ is a 2000 molecular weight polytetramethylene ether glycol with a nominal functionality of 2.0. To this, 114 grams of Acclaim 6320™ is charged with constant agitation under a nitrogen blanket. The Acclaim 6320™ is a commercial low unsaturation polyoxyethylene terminated polyoxypropylene polyether triol having a molecular weight of about 6000 and a functionality of about 3.0. This prepolymer is allowed to cool to room temperature overnight and yields a nominal 12.5% NCO prepolymer.

Prepolymer Example 7 (P7)

A laboratory blend of about one-quart of the prepolymer was prepared by charging 486.1 grams of Mondur CD™ into a clean glass reactor. Dry nitrogen gas was used to blanket the liquid and mild agitation mixing was initiated via a mechanical mixing device. The Mondur CD™ is a commercially available uretonimine-modified Mondur M™ to yield a room temperature liquid isocyanate with an NCO functionality of about 2.10 and a molecular weight of about 142. To this, 406 grams of Acclaim 2220™ is charged with constant agitation under a nitrogen blanket. The Acclaim 2220™ is a 2000 molecular weight low unsaturation polyoxypropylene/polyoxyethylene diol with a nominal functionality of 2.0. To this, 108.1 grams of Acclaim 6320™ is charged with constant agitation under a nitrogen blanket. The Acclaim 6320™ is a commercial low unsaturation polyoxyethylene terminated polyoxypropylene polyether triol having a molecular weight of about 6000 and a functionality of about 3.0. This prepolymer is allowed to cool to room temperature overnight and yields a nominal 12.5% NCO prepolymer.

Prepolymer Example 8 (P8)

A laboratory blend of about one-quart of the prepolymer was prepared by charging 537 grams of Rubinate 1027™ into a clean glass reactor. Dry nitrogen gas was used to blanket the liquid and mild agitation mixing was initiated via a mechanical mixing device. The Rubinate 1027™ is a commercial prepolymer produced from Rubinate 44™ and a polytetramethylene ether glycol of about 1000 molecular weight to yield a 29.5% NCO terminated-isocyanate of nominal 2.0 functionality and an average molecular weight of 154. To this, 361.1 grams of Terathane 2000™ is charged with constant agitation under a nitrogen blanket. The Terathane 2000™ is a 2000 molecular weight polytetramethylene ether glycol with a nominal functionality of 2.0. To this, 101.9 grams of Poly-G 30-28™ is charged with constant agitation under a nitrogen blanket. The Poly-G 30-28™ is a 6000 molecular weight triol with a nominal functionality of 3.0. This prepolymer is allowed to cool to room temperature overnight and yields a nominal 12.5% NCO prepolymer.

CURATIVE BATCH PROCESSING PROCEDURE

Examples of the procedure for processing a curative followed by examples of weights and measures for alternate curatives follow.

Curative Example 1 (C1)

A laboratory blend of about one-gallon of the curative was prepared by charging 2800 grams of Lyondell Acclaim 2220™ into a clean one-gallon container. The Acclaim 2220™ is a commercial low unsaturation polyoxyethylene terminated polyoxypropylene polyether diol having a molecular weight of about 2000 and a functionality of about 2.0. To this, 600 grams of Acclaim 6320™ is charged into the container. The Acclaim 6320™ is a commercial low unsaturation polyoxyethylene terminated polyoxypropylene polyether triol having a molecular weight of about 6000 and a functionality of about 3.0. To this, 600 grams of 1,4-butanediol is charged into the container. The 1,4-butanediol is a 90 molecular weight diol crosslinker with a nominal functionality of 2.0. To this, 0.2 gram of SAG 47™ (silicon emulsion) is added into the container. Sag 47™ is a commercial degassing agent commonly used for bubble breaking and dissipation in the urethane industry. Finally, 0.18 gram of bismuth neodecanoate 20% is charged into the container. The bismuth neodecanoate is a polyurethane catalyst from Shepherd Chemicals used in the industry for curing polyurethanes. These ingredients are mixed to homogeneity and degassed under about 28 inches of Hg vacuum. This curative blend is transferred to a closed container under a nitrogen blanket and yields a viscosity of 550 cps.

Curative Example 2 (C2)

A laboratory blend of about one-gallon of the curative was prepared by charging 2800 grams of Lyondell Acclaim 2220™ into a clean one-gallon container. The Acclaim 2220™ is a commercial low unsaturation polyoxyethylene terminated polyoxypropylene polyether diol having a molecular weight of about 2000 and a functionality of about 2.0. To this, 600 grams of Acclaim 6320™ is charged into the container. The Acclaim 6320™ is a commercial low unsaturation polyoxyethylene terminated polyoxypropylene polyether triol having a molecular weight of about 6000 and a functionality of about 3.0. To this, 600 grams of 1,4-butanediol is charged into the container. The 1,4-butanediol is a 90 molecular weight diol crosslinker with a nominal functionality of 2.0. To this, 0.2 gram of SAG 47™ is added into the container. Sag 47™ is a commercial degassing agent commonly used for bubble breaking and dissipation in the urethane industry. Finally, 2.60 grams of KE 9362™ is charged into the container. The KE 9362™ is a proprietary polyurethane catalyst comprising 2,3-dimethyltetrahydropyrimidine in a triethylenediamine and dipropylene glycol admixture from Rhein-Chemie used in the industry for curing polyurethanes. These ingredients are mixed to homogeneity and degassed under about 28 inches of Hg vacuum. This curative blend is transferred to a closed container under a nitrogen blanket and yields a viscosity of 550 cps.

Curative Example 3 (C3)

A laboratory blend of about one-gallon of the curative was prepared by charging 2800 grams of Lyondell Acclaim 2220™ into a clean one-gallon container. The Acclaim 2220™ is a commercial low unsaturation polyoxyethylene terminated polyoxypropylene polyether diol having a molecular weight of about 2000 and a functionality of about 2.0. To this, 600 grams of Acclaim 6320™ is charged into the container. The Acclaim 6320™ is a commercial low unsaturation polyoxyethylene terminated polyoxypropylene polyether trial having a molecular weight of about 6000 and a functionality of about 3.0. To this, 600 grams of 1,4-butanediol is charged into the container. The 1,4-butanediol is a 90 molecular weight diol crosslinker with a nominal functionality of 2.0. To this, 0.2 gram of SAG 47™ is added into the container. Sag 47™ is a commercial degassing agent commonly used for bubble breaking and dissipation in the urethane industry. Finally, 0.160 gram of BiCat 8™ is charged into the container. The BiCat 8™ is a polyurethane catalyst from Shepherd Chemicals used in the industry for curing polyurethanes and is comprised of an equal blend of bismuth neodecanoate and zinc neodecanoate. These ingredients are mixed to homogeneity and degassed under about 28 inches of Hg vacuum. This curative blend is transferred to a closed container under a nitrogen blanket and yields a viscosity of 550 cps.

Curative Example 4 (C4)

A laboratory blend of about one-gallon of the curative was prepared by charging 2800 grams of Lyondell Acclaim 2220™ into a clean one-gallon container. The Acclaim 2220™ is a commercial low unsaturation polyoxyethylene terminated polyoxypropylene polyether diol having a molecular weight of about 2000 and a functionality of about 2.0. To this, 600 grams of Acclaim 6320™ is charged into the container. The Acclaim 6320™ is a commercial low unsaturation polyoxyethylene terminated polyoxypropylene polyether triol having a molecular weight of about 6000 and a functionality of about 3.0. To this, 600 grams of 1,4-butanediol is charged into the container. The 1,4-butanediol is a 90 molecular weight diol crosslinker with a nominal functionality of 2.0. To this, 0.2 gram of SAG 47™ is added into the container. Sag 47™ is a commercial silicone emulsion degassing agent commonly used for bubble breaking and dissipation in the urethane industry. Finally, 1.52 grams of Toyocat F-10™ is charged into the container. The F-10™ is a dimethylimidazole-containing polyurethane catalyst from Tosoh Chemicals used in the industry for curing polyurethanes. These ingredients are mixed to homogeneity and degassed under about 28 inches of Hg vacuum. This curative blend is transferred to a closed container under a nitrogen blanket and yields a viscosity of 550 cps.

Curative Example 5 (C5)

A laboratory blend of about one-gallon of the curative was prepared by charging 2800 grams of Lyondell Acclaim 2220™ into a clean one-gallon container. The Acclaim 2220™ is a commercial low unsaturation polyoxyethylene terminated polyoxypropylene polyether diol having a molecular weight of about 2000 and a functionality of about 2.0. To this, 600 grams of Acclaim 6320™ is charged into the container. The Acclaim 6320™ is a commercial low unsaturation polyoxyethylene terminated polyoxypropylene polyether triol having a molecular weight of about 6000 and a functionality of about 3.0. To this, 600 grams of 1,4-butanediol is charged into the container. The 1,4-butanediol is a 90 molecular weight diol crosslinker with a nominal functionality of 2.0. To this, 0.2 gram of SAG 47™ is added into the container. Sag 47™ is a commercial silicone emulsion degassing agent commonly used for bubble breaking and dissipation in the urethane industry. Finally, 0.80 gram of TD-33™ is charged into the container. The TD-33™ is a triethylene diamine catalyst from Texaco or Focus Chemicals used in the industry for curing polyurethanes. These ingredients are mixed to homogeneity and degassed under about 28 inches of Hg vacuum. This curative blend is transferred to a closed container under a nitrogen blanket and yields a viscosity of 550 cps.

Curative Example 6 (C6)

A laboratory blend of about one-gallon of the curative was prepared by charging 2800 grams of Lyondell Acclaim 2220™ into a clean one-gallon container. The Acclaim 2220™ is a commercial low unsaturation polyoxyethylene terminated polyoxypropylene polyether diol having a molecular weight of about 2000 and a functionality of about 2.0. To this, 600 grams of Acclaim 6320™ is charged into the container. The Acclaim 6320™ is a commercial low unsaturation polyoxyethylene terminated polyoxypropylene polyether triol having a molecular weight of about 6000 and a functionality of about 3.0. To this, 600 grams of 1,4-butanediol is charged into the container. The 1,4-butanediol is a 90 molecular weight diol crosslinker with a nominal functionality of 2.0. To this, 0.2 gram of SAG 47™ is added into the container. Sag 47™ is a commercial degassing agent commonly used for bubble breaking and dissipation in the urethane industry. Finally, 0.80 gram of SUL-4™ is charged into the container. The SUL-4™ is a dibutyltin dilaurate metal catalyst from CKWitco used in the industry for curing polyurethanes. These ingredients are mixed to homogeneity and degassed under about 28 inches of Hg vacuum. This curative blend is transferred to a closed container under a nitrogen blanket and yields a viscosity of 550 cps.

Curative Example 7 (C7)

A laboratory blend of about one-gallon of the curative was prepared by charging 2800 grams of Lyondell Acclaim 2220™ into a clean one-gallon container. The Acclaim 2220™ is a commercial low unsaturation polyoxyethylene terminated polyoxypropylene polyether diol having a molecular weight of about 2000 and a functionality of about 2.0. To this, 600 grams of Acclaim 6320™ is charged into the container. The Acclaim 2220™ is a commercial low unsaturation polyoxyethylene terminated polyoxypropylene polyether triol having a molecular weight of about 6000 and a functionality of about 3.0. To this, 600 grams of 1,4-butanediol is charged into the container. The 1,4-butanediol is a 90 molecular weight diol crosslinker with a nominal functionality of 2.0. To this, 0.2 gram of SAG 47™ is added into the container. Sag 47™ is a commercial degassing agent commonly used for bubble breaking and dissipation in the urethane industry. Finally, 0.32 gram of TD-33™ and 1.0 gram of KE9362™ are charged into the container. The TD-33™ is a triethylene diamine catalyst from Texaco Chemicals and the KE 9362™ is a proprietary polyurethane catalyst comprising 2,3-dimethyltetrahydropyrimidine in a triethylenediamine and dipropylene glycol admixture from Rhein-Chemie used in the industry for curing polyurethanes. These ingredients are mixed to homogeneity and degassed under about 28 inches of Hg vacuum. This curative blend is transferred to a closed container under a nitrogen blanket and yields a viscosity of 550 cps.

Curative Example 8 (C8)

A laboratory blend of about one-gallon of the curative was prepared by charging 2800 grams of Arch Poly-G 55-56™ into a clean one-gallon container. The Poly-G 55-56™ is a commercial polyoxyethylene terminated polyoxypropylene polyether diol having a molecular weight of about 2000 and a functionality of about 2.0. To this, 600 grams of Poly-G 85-29™ is charged into the container. The Poly-G 85-29™ is a commercial polyoxyethylene terminated polyoxypropylene polyether triol having a molecular weight of about 6000 and a functionality of about 3.0. To this, 600 grams of 1,4-butanediol is charged into the container. The 1,4-butanediol is a 90 molecular weight diol crosslinker with a nominal functionality of 2.0. To this, 0.2 gram of SAG 47™ is added into the container. Sag 47™ is a commercial degassing agent commonly used for bubble breaking and dissipation in the urethane industry. Finally, 0.32 gram of TD-33™ and 1.0 gram of KE9362™ are charged into the container. The TD-33™ is a triethylene diamine catalyst from Texaco Chemicals and the KE 9362™ is a proprietary polyurethane catalyst comprising 2,3-dimethyltetrahydropyrimidine from Rhein-Chemie used in the industry for curing polyurethanes. These ingredients are mixed to homogeneity and degassed under about 28 inches of Hg vacuum. This curative blend is transferred to a closed container under a nitrogen blanket and yields a viscosity of 550 cps.

Curative Example 9 (C9)

A laboratory blend of about one-gallon was prepared by charging 2153.6 grams of Acclaim™ 2220 into a clean one-gallon container. The Acclaim™ 2220 is a commercial low unsaturation polyoxyethylene-terminated polyoxypropylene polyether diol having a molecular weight of about 2000 and a functionality of about 2.0. To this, 523.2 grams of Acclaim™ 6320 is charged into the container. The Acclaim™ 6320 is a commercial low unsaturation polyoxyethylene-terminated polyoxypropylene polyether triol having a molecular weight of about 6000 and a functionality of about 3.0. To this, 400 grams of 1,4-butanediol is charged into the container. The 1,4-butanediol is a 90 molecular weight diol crosslinker with a nominal functionality of 2.0. These ingredients are homogenized in the container. To this, with constant agitation, 615.3 grams of the prepolymer, P1, is charged into the container. This mixture is brought up to a temperature of 80° C. for about three hours to facilitate completion of reaction between the curative and the prepolymer. To this, 307.6 grams of Santicizer™ 160 is added into the container. Santicizer™ 160 is a commercially available alkyl benzyl phthalate. To this, 0.2 gram of SAG™ 47 is added into the container. SAG™ 47 is a commercial degassing agent commonly used for bubble breaking and dissipation in the urethane industry. Finally, 0.2 gram of bismuth neodecanoate 20% is added to the container. Bismuth neodecanoate 20% is a commercial catalyst from Shepherd Chemicals. These ingredients are mixed to homogeneity and degassed under about 28 inches of Hg vacuum. This curative blend is transferred to a closed container under a nitrogen blanket and yields a viscosity of 3980 cps.

Curative Example 10 (C10)

A laboratory blend of about one-gallon was prepared by charging 1400 grams of Acclaim™ 2220 into a clean one-gallon container. The Acclaim™ 2220 is a commercial low unsaturation polyoxyethylene-terminated polyoxypropylene polyether diol having a molecular weight of about 2000 and a functionality of about 2.0. To this, 560 grams of Acclaim 6320 is charged into the container. The Acclaim™ 6320 is a commercial low unsaturation polyoxyethylene-terminated polyoxypropylene polyether triol having a molecular weight of about 6000 and a functionality of about 3.0. To this, 840 grams of 1,4-butanediol is charged into the container. The 1,4-butanediol is a 90 molecular weight diol crosslinker with a nominal functionality of 2.0. These ingredients are homogenized in the container. To this, with constant agitation, 1200 grams of the prepolymer, P1, is charged into the container. This mixture is brought up to a temperature of 80° C. for about three hours to facilitate completion of reaction between the curative and the prepolymer. To this, 0.2 gram of SAG™ 47 is added into the container. SAG™ 47 is a commercial degassing agent commonly used for bubble breaking and dissipation in the urethane industry. Finally, 0.2 gram of bismuth neodecanoate 20% is added to the container. Bismuth neodecanoate 20% is a commercial urethane catalyst from Shepherd Chemicals. These ingredients are mixed to homogeneity and degassed under about 28 inches of Hg vacuum. This curative blend is transferred to a closed container under a nitrogen blanket and yields a viscosity of 50,000 cps.

Curative Example 11 (C11)

A laboratory blend of about one-gallon was prepared by charging 2332.8 grams of Acclaim™ 2220 into a clean one-gallon container. The Acclaim™ 2220 is a commercial low unsaturation polyoxyethylene-terminated polyoxypropylene polyether diol having a molecular weight of about 2000 and a functionality of about 2.0. To this, 566.8 grams of Acclaim™ 6320 is charged into the container. The Acclaim™ 6320 is a commercial low unsaturation polyoxyethylene-terminated polyoxypropylene polyether triol having a molecular weight of about 6000 and a functionality of about 3.0. To this, 433.2 grams of 1,4-butanediol is charged into the container. The 1,4-butanediol is a 90 molecular weight diol crosslinker with a nominal functionality of 2.0. These ingredients are homogenized in the container. To this, with constant agitation, 666.4 grams of the prepolymer, P1, is charged into the container. This mixture is brought up to a temperature of 80° C. for about three hours to facilitate completion of reaction between the curative and the prepolymer. To this, 0.2 gram of SAG™ 47 is added into the container. SAG™ 47 is a commercial degassing agent commonly used for bubble breaking and dissipation in the urethane industry. Finally, 0.2 gram of bismuth neodecanoate 20% is added to the container. Bismuth neodecanoate 20% is a commercial catalyst from Shepherd Chemicals. These ingredients are mixed to homogeneity and degassed under about 28 inches of Hg vacuum. This curative blend is transferred to a closed container under a nitrogen blanket and yields a viscosity of 3100 cps.

Curative Example 12 (C12)

A laboratory blend of about one-gallon was prepared by charging 2153.6 grams of Acclaim™ 2220 into a clean one-gallon container. The Acclaim™ 2220 is a commercial low unsaturation polyoxyethylene-terminated polyoxypropylene polyether diol having a molecular weight of about 2000 and a functionality of about 2.0. To this, 523.2 grams of Acclaim™ 6320 is charged into the container. The Acclaim™ 6320 is a commercial low unsaturation polyoxyethylene-terminated polyoxypropylene polyether triol having a molecular weight of about 6000 and a functionality of about 3.0. To this, 400 grams of 1,4-butanediol is charged into the container. The 1,4-butanediol is a 90 molecular weight diol crosslinker with a nominal functionality of 2.0. These ingredients are homogenized in the container. To this, with constant agitation, 615.2 grams of the prepolymer, P4, is charged into the container. This mixture is brought up to a temperature of 80° C. for about three hours to facilitate completion of reaction between the curative and the prepolymer. To this, 307.6 grams of Santicizer™ 160 is added into the container. Santicizer™ 160 is a commercially available alkyl benzyl phthalate. To this, 0.2 gram of SAG™ 47 is added into the container. SAG™ 47 is a commercial degassing agent commonly used for bubble breaking and dissipation in the urethane industry. Finally, 0.2 gram of bismuth neodecanoate 20% is added to the container. Bismuth neodecanoate 20% is a commercial catalyst from Shepherd Chemicals. These ingredients are mixed to homogeneity and degassed under about 28 inches of Hg vacuum. This curative blend is transferred to a closed container under a nitrogen blanket and yields a viscosity of 26000 cps.

Curative Example 13 (C13)

A laboratory blend of about one-gallon was prepared by charging 2153.6 grams of Acclaim™ 2220 into a clean one-gallon container. The Acclaim™ 2220 is a commercial low unsaturation polyoxyethylene-terminated polyoxypropylene polyether diol having a molecular weight of about 2000 and a functionality of about 2.0. To this, 523.2 grams of Acclaim™ 6320 is charged into the container. The Acclaim™ 6320 is a commercial low unsaturation polyoxyethylene-terminated polyoxypropylene polyether triol having a molecular weight of about 6000 and a functionality of about 3.0. To this, 400 grams of 1,4-butanediol is charged into the container. The 1,4-butanediol is a 90 molecular weight diol crosslinker with a nominal functionality of 2.0. These ingredients are homogenized in the container. To this, with constant agitation, 615.2 grams of the prepolymer, P3, is charged into the container. This mixture is brought up to a temperature of 80° C. for about three hours to facilitate completion of reaction between the curative and the prepolymer. To this, 307.6 grams of Santicizer™ 160 is added into the container. Santicizer™ 160 is a commercially available alkyl benzyl phthalate. To this, 0.2 gram of SAG™ 47 is added into the container. SAG™ 47 is a commercial degassing agent commonly used for bubble breaking and dissipation in the urethane industry. Finally, 0.2 gram of bismuth neodecanoate 20% is added to the container. Bismuth neodecanoate 20% is a commercial catalyst from Shepherd Chemicals. These ingredients are mixed to homogeneity and degassed under about 28 inches of Hg vacuum. This curative blend is transferred to a closed container under a nitrogen blanket and yields a viscosity of 2160 cps.

Elastomer Casting Procedures

An example of the procedure for casting polyurethane products from the prepolymer and curative components follows, and is given as an example of a general casting procedure with variations possible for those knowledgeable in the art.

The prepolymer is weighed into a suitable container and degassed under about 28 inches of Hg vacuum to remove dissolved gases. Based upon the weight of prepolymer, the curative weight is calculated and the curative degassed under about 28 inches of Hg vacuum. The curative weight is calculated to provide approximately stoichiometric equivalents of prepolymer and curative, preferably not more than a 13% excess and most preferably a 2 to 7 percent stoichiometric excess of the prepolymer. This ratio of prepolymer equivalents to curative equivalents is referred to as the index and the index is generally 1.0 to 1.13/1.0 and most preferably 1.02 through 1.07/1.0. The curative is then added to the prepolymer and mixed to homogeneity at room temperature (approximately 77° F.). The mixture is then degassed under about 28 inches of Hg vacuum to remove air entrapped during the mixing procedure. The degassed mixture is then introduced into the mold by slowly pouring the reacting liquid down the side of the mold to the desired fill point. In the case of test molds, a dividing plate is slid into the mold to produce two test panels of 0.080 thickness. The material is allowed to react to a point where it can be removed from the mold without undue stress on the finished urethane product. This test plaque is then allowed to set at room temperature for a minimum of seven-days from the time it was poured into the mold. At this time, test parts are cut from the 0.080 inch thick panels by standardized cutters, tested as per the,respective ASTM test procedures, and the results recorded.

In the Table which follows, the viscosity is at room temperature in cps and the gel time is at a temperature of 25° C.

Results and Properties of Examples
the results and physical properties of the products of the examples follow

| Prepolymer Example | Example A P1 | Example B P2 | Example C P1 | Example D P1 | Example E P5 | Example F P6 | Example G P7 | Example H P1 |
|---|---|---|---|---|---|---|---|---|
| % NCO | 12.64 | 12.47 | 12.8 | 12.8 | 12.43 | 12.52 | 12.52 | 12.64 |
| Liquid @ Room Temperature | Yes | Yes | Yes | Yes | Yes | Yes | Yes | Yes |
| Liquid Stable | Yes | Yes | Yes | Yes | Yes | Yes | Yes | Yes |
| Curative Example | C7 | C7 | C13 | C12 | C7 | C7 | C7 | C1 |
| Viscosity | 550 | 550 | 2160 | 26000 | 550 | 550 | 550 | 550 |
| Liquid Stable | Yes | Yes | Yes | Yes | Yes | Yes | Yes | Yes |
| Mix Ratio Curative per 100 Prepolymer | 69.8 | 68.8 | 129.48 | 109.12 | 68.6 | 72.6 | 69.1 | 70.5 |
| Tensile in psi (ASTM D-412) | 2281 | 2170 | 1339 | 1589 | 1673 | 1848.2 | 1846 | 2150.6 |
| Elongation in % (ASTM D-412) | 683.5 | 373 | 401 | 458 | 661.2 | 539.1 | 696.9 | 535.3 |
| Die-C Tear in pli (ASTM D-624) | 276 | 281 | 289 | 246 | 377.4 | 219 | 250 | 285.4 |
| Trouser Tear in pli (ASTM D-1938) | 65.2 | 54 | 54 | 41 | 95.1 | 55.3 | 74 | 44.7 |
| Shore A Hardness (ASTM D-2240) | 84 | 83 | 82 | 82 | 79 | 73 | 82 | 85 |
| % Rebound (ASTM D-2632) | 58 | 53 | 53 | 59 | 60 | 46 | 55 | 57 |
| Gel Time | 26 min | 25 min | 22 min | 18 min | 30 min | 32 min | 28 min | 28 min |

| Prepolymer Example | Example I P1 | Example J P1 | Example K P1 | Example L P1 | Example M P1 | Example N P1 | Example O P1 | Example P P1 | Example Q P1 |
|---|---|---|---|---|---|---|---|---|---|
| % NCO | 12.64 | 12.64 | 12.64 | 12.64 | 12.64 | 12.52 | 12.8 | 12.8 | 12.8 |
| Liquid @ Room Temperature | Yes | Yes | Yes | Yes | Yes | Yes | Yes | Yes | Yes |
| Liquid Stable | Yes | Yes | Yes | Yes | Yes | Yes | Yes | Yes | Yes |
| Curative Example | C2 | C3 | C4 | C5 | C6 | C8 | C9 | C10 | C11 |
| Viscosity | 550 | 550 | 550 | 550 | 550 | 550 | 3980 | 50,000 | 3,100 |
| Liquid Stable | Yes | Yes | Yes | Yes | Yes | Yes | Yes | Yes | Yes |
| Mix Ratio Curative per 100 Prepolymer | 70.5 | 70.5 | 70.5 | 70.5 | 70.5 | 69.5 | 125 | 67.8 | 66.83 |
| Tensile in psi (ASTM D-412) | 2700 | 2082.4 | 2286 | 1764.4 | 2163.4 | 2146 | 1400 | 2208 | 1643 |
| Elongation in % (ASTM D-412) | 512.3 | 592.4 | 687.7 | 629.3 | 515.7 | 601.6 | 535 | 519 | 430 |
| Die-C Tear in pli (ASTM D-624) | 302.2 | 324.9 | 255.5 | 278.3 | 240.7 | 273.5 | 223 | 342 | 261 |
| Trouser Tear in pli (ASTM D-1938) | 80.2 | 54.5 | 66.2 | 65 | 50.3 | 79.2 | 47.5 | 89 | 50 |
| Shore A Hardness (ASTM D-2240) | 84 | 86 | 84 | 84 | 86 | 83 | 80 | 94 | 85 |
| % Rebound (ASTM D-2632) | 55 | 57 | 57 | 55 | 58 | 54 | 56 | 54 | 54 |
| Gel Time | 21 min | 27 min | 28 min | 28 min | 27 min | 26 min | 27 min | 30 min | 29 min |

Cured Polyurethane Product

The following is an example of a typical method of pour-in-place polyurethane elastomer production.

Verify all individual factors involved in the pour prior to proceeding with the fill process. Check the prepolymer for % NCO, component temperatures, adequate degassing of the individual components, mold temperature, and the mix capabilities of the equipment. Using the selected prepolymer and curative, calculate and verify the correct ratio of components to be used. Verify that the mold is assembled properly with all inserts and integral parts properly treated and correctly positioned and attached.

If using a metering machine, measure timed shots of the individual components and adjust the equipment to meter the correct component ratio. Measure and record the ratio several times at the process speeds and temperatures under which the elastomer will be poured to ensure correct processing. Verify that the machine has sufficient material for the part(s) to be poured and actuate the machine. Pour a small sample to verify thorough mixing, freedom from air and moisture contamination, and the correct gel time. Ensure that the machine has sufficient flush material. Arrange the molds to be poured in a manner to facilitate the production of the parts for ease and efficiency. Make any adjustments necessary to achieve the desired processing conditions and begin filling the molds in a manner to minimize the possibility of air occlusion. Fill the molds to the correct fill level.

If hand pouring, verify the mixing equipment and the scale accuracy before mixing. Arrange the molds to be poured in a manner to facilitate the production of the parts for ease and efficiency. Weigh out the correct component quantities and blend them thoroughly while introducing as little air as possible into the product. If time permits, de-gas the blended system at 28–30 in. of Hg while watching to minimize the potential for difficulties caused by overflow of the material when foam is produced. Remove the degassed system and fill the mold(s) in a manner to minimize the possibility of air occlusion. Fill the molds to the correct fill level.

This procedure can be followed for room- or ambient-temperature production of numerous types of polyurethane elastomeric products from the prepolymer and curative components of the present invention, including industrial tires, vibratory bowl linings, sprockets and couplings, gaskets, skateboard wheels, and a variety of other applications requiring a high-performance polyurethane elastomer.

For purposes of customer/user convenience, the selected prepolymer and its precalculated complementary curative may advantageously be separately packaged, but sold together as a single unit or kit.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

We claim:

1. A room-temperature liquid stable prepolymer (P) which is the reaction product of
    a) methylene diphenylisocyanate or a prepolymer of methylene diphenylisocyanate and an about 500–1000 equivalent weight polytetramethylene ether glycol or polyoxypropylene/polyoxyethylene diol or triol having at least 21% residual NCO,
    b) polytetramethylene ether glycol of about 500 to 1000 equivalent weight, and
    c) a polyoxypropylene/polyoxyethylene triol or polyoxypropylene triol of about 1300 to 2000 equivalent weight,
    the percentage weight/weight in the prepolymer (P) being about 32 to 72% of (a), about 52 to 22% of (b), and about 6 to 15% of (c), and the percentage of residual NCO in the prepolymer (P) being about 6 to 18% by weight,
    the prepolymer (P) having a viscosity at room temperature of about 1200 to 26000 cps,
    which prepolymer (P) is curable and castable with a liquid curative at room temperature to yield a urethane elastomer.

2. The prepolymer (P) of claim 1 wherein the percentage of residual NCO in the prepolymer (P) is about 11.5–13.5% weight/weight and wherein the prepolymer (P) has a room temperature viscosity of about 3500 to 5000 cps.

3. The prepolymer (P) of claim 2 wherein the percentages weight/weight of a), b), and c) are respectively about 54%, about 36%, and about 10%.

4. The prepolymer (P) of claim 1 wherein a) is methylene diphenylisocyanate.

5. The prepolymer (P) of claim 1 wherein c) is a polyoxypropylene/polyoxyethylene triol having an equivalent weight of about 1300 to 2000.

6. The prepolymer (P) of claim 1 wherein c) is a polyoxypropylene triol having an equivalent weight of bout 1300 to 2000.

7. The prepolymer (P) of claim 1 wherein (a) is a uretonimine-modified methylene diphenylisocyanate.

8. The prepolymer (P) of claim 1 wherein b) has an equivalent weight of about 500.

9. The prepolymer (P) of claim 1 wherein b) has an equivalent weight of about 1000.

10. The prepolymer (P) of claim 1 wherein a) is a previously-prepared reaction product of methylene diphenylisocyanate and polytetramethylene ether glycol having an equivalent weight of about 500 to 1000.

11. The prepolymer (P) of claim 1 wherein a) is a previously-prepared reaction product of methylene diphenylisocyanate and a polyoxypropylene/polyoxyethylene diol having an equivalent weight of about 500 to 1000.

12. A room temperature liquid curative having-a room temperature viscosity of from 300–50000 cps and consisting essentially of the following components:
    (1) a polyoxypropylene/-polyoxyethylene diol of about 1000 to 2000 equivalent weight, (2) a polyoxypropylene/-polyoxyethylene triol of about 1300 to 2000 equivalent weight, (3) a chain extender having an equivalent weight of about 25 to 125, (4) a room-temperature liquid stable prepolymer (P), the prepolymer (P) being the reaction product of
    a) methylene diphenylisocyanate or a prepolymer of methylene diphenylisocyanate and an about 500–1000 equivalent weight polytetramethylene ether glycol or polyoxypropylene/polyoxyethylene diol or triol having at least 21% residual NCO,
    b) polytetramethylene ether glycol or about 500 to 1000 equivalent weight, and
    c) a polyoxypropylene/polyoxyethylene triol or polyoxypropylene triol of about 1300 to 2000 equivalent weight,
    the percentage weight/weight in the prepolymer (P) being about 32 to 72% of (a), about 52 to 22% of (b), and about 6 to 15% of (c), and the percentage of residual NCO in the prepolymer (P) being about 6 to 18% by weight, and having a viscosity at room temperature of about 1200 to 26000 cps, (5) a diluent, (6) a degassing aid, and (7) a urethane catalyst, the relative weight % amounts being respectively 30–90%, 3–20%, 5–30%, 10–30%, 0–15%, 0.001–0.05%, and 0.01–0.5%, based on the weight of the liquid curative.

13. A room temperature liquid curative having a room temperature viscosity of from 300–50000 cps and consisting essentially of the following components:

(1) a polyoxypropylene/-polyoxyethylene diol of about 1000 to 2000 equivalent weight, (2) a polyoxypropylene/-polyoxyethylene triol of about 1300 to 2000 equivalent weight, (3) a chain extender having an equivalent weight of about 25 to 125, (4) a room-temperature liquid stable prepolymer (P), the prepolymer (P) being the reaction product of a) methylene diphenylisocyanate or a prepolymer of methylene diphenylisocyanate and an about 500–1000 equivalent weight polytetramethylene ether glycol or polyoxypropylene/polyoxyethylene diol or triol having at least 21% residual NCO, b) polytetramethylene ether glycol or about 500 to 1000 equivalent weight, and c) a polyoxypropylene/polyoxyethylene triol or polyoxypropylene triol of about 1300 to 2000 equivalent weight, the percentage weight/weight in the prepolymer (P) being about 32 to 72% of (a), about 52 to 22% of (b), and about 6 to 15% of (c), and the percentage of residual NCO in the prepolymer (P) being about 6 to 18% by weight, and having a viscosity at room temperature of about 1200 to 26000 cps, (5) a diluent, (6) a degassing aid, and (7) a urethane catalyst, the relative weight % amounts being respectively 30–90%, 3–20%, 5–30%, 10–30%, 0–15%, 0.001–0.05%, and 0.01–0.5%, based on the weight of the liquid curative, to give a cured urethane elastomer having the following properties after mixing with prepolymer (P) and curing for seven days at room temperature:

| | |
|---|---|
| Tensile strength (ASTM Method D-412) | about 1300–2700 psi |
| Elongation (ASTM Method D-412) | about 250–700% |
| Die C Tear (ASTM Method D-695) | about 140–400 pli |
| Split Tear (ASTM Method D-1938) | about 20–100 pli |
| Rebound (ASTM Method D-2632) | about 45–65% |
| Shore A Hardness (ASTM Method D-2240) | about 70–95 |
| Gel time (25° C.) | about 14–40 min.. |

* * * * *